Aug. 8, 1939.    A. L. GALUSHA    2,169,123
EXPLOSION RELIEF MEANS
Filed Oct. 27, 1936

INVENTOR
ALBERT L. GALUSHA
BY HIS ATTORNEYS
Howson and Howson

Patented Aug. 8, 1939

2,169,123

UNITED STATES PATENT OFFICE 2,169,123

EXPLOSION RELIEF MEANS

Albert Leet Galusha, Caldwell, N. J.

Application October 27, 1936, Serial No. 107,898

5 Claims. (Cl. 220—89)

This invention relates to means for relieving pressures resulting from explosions and more particularly for relieving the pressures resulting from the explosion of gas in gas producers and it is an object of this invention to provide a means of the type described which is efficient in operation and of economical construction and which provides a gas tight closure normally preventing the escape of gas from the gas producer. It is also an object of this invention to provide a means of the type described which can be readily restored to its normal condition after an explosion and which prevents the entry of air to the chamber in which the explosion occurred following an explosion.

In the drawing—

Figure 1:
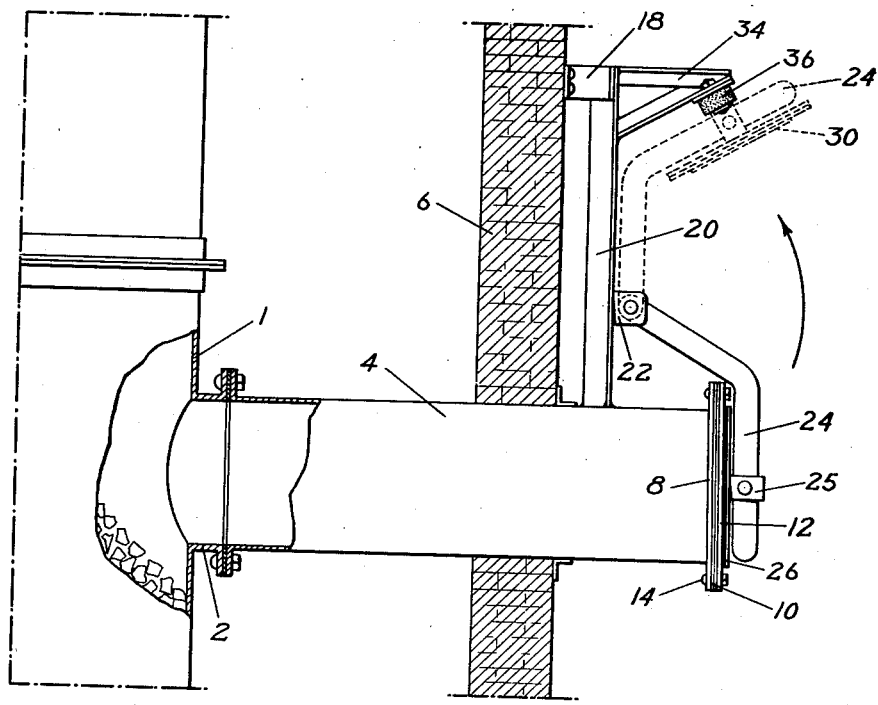
Fig. 1 is a view showing a portion of a gas producer structure, partly in elevation and partly in section with a pressure relief means constructed in accordance with this invention applied thereto.
Figure 2:
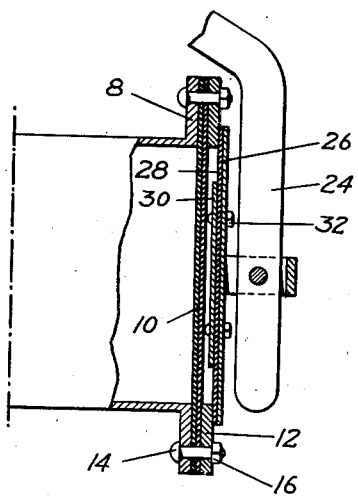
Fig. 2 is a view in vertical section of the pressure relief means shown in Fig. 1.
Figure 3:
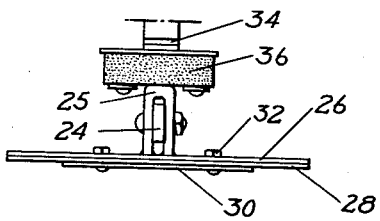
Fig. 3 is a fragmentary plan view showing the relation of the parts when the movable portion is raised to the dotted line position shown in Fig. 1.

In the drawing the invention is shown in connection with a gas producer of the general type shown in my Patent No. 1,947,339, dated February 13, 1934, although it is to be understood that the invention can be applied in other arrangements and to other types of gas producers. In the type of gas producer shown the coal bin 1 is normally in open connection with the body of the producer so that the fuel can feed continuously from the bin to the producer, the coal bin being shut off from the producer only at intervals and then only long enough to permit of the filling of the coal bin from the coal storage maintained above the coal bin. As shown in the drawing, the coal bin 1 is provided with a flanged outlet 2 to which is secured a flanged pipe 4 which extends outwardly from the coal bin. In those cases in which the producer is housed within a building, the pipe 4 extends outwardly of the building wall 6 and is flanged at its outer end, as at 8, to form a seat for one or more thin rubber disks 10 secured to the flange 8 so as to form a gas tight seal therewith by a retaining ring 12 held in position by bolts 14 which extend through the flange 8, disks 10 and ring 12 and have nuts 16 threaded thereon.

Secured to the pipe 4 and to a bracket 18 attached to the wall 6 is an upright member 20 having attached thereto a bracket 22 in which an arm 24 is pivotally mounted. Pivotally mounted on the arm 24 adjacent its free end is a yoke 25 carrying a metal plate or disk 26 to which a thin rubber disk 28 is secured by a metal plate 30 of less diameter than the rubber disk 28, which is secured to the disk 26 by bolts 32. The arm 24 is bent to an angular shape so that the rubber disk 28 will be flat against the outer face of the retaining ring 12 when the arm 24 is in its downward position and be held seated thereon by gravity. The outer face of the ring 12 is finished to provide a proper seat for the rubber disk 28.

To the upper end of the member 20 is secured an outwardly projecting angular bracket or support 34 on which is mounted a buffer block 36 of rubber or other suitable material positioned to be engaged by the yoke 25 on the arm 24 when the arm 24 is raised to the dotted line position shown in Fig. 1.

In the normal positions of the means disclosed the rubber disks 10 seal the end of the pipe 4 and prevent leakage of the gas therefrom, the coal bin 1 having gas under light pressure therein because of its normally open connection with the body of the gas producer. The arm 24 is in its lower position with the rubber disk 28 seated on the ring 12 and with the metal disk 26 forming a cover or shield for the rubber disks 10.

When, due to leakage of air therein, the gas in the coal bin 1 becomes explosive and an explosion results, the sudden increase in pressure which results in the coal bin and pipe 4 causes the rupturing of the thin rubber disks 10 and the movement of the arm 24 and the disks carried thereby toward the dotted line position shown in Fig. 1. The rupturing of the disks 10 and the movement of the arm 24 and the disks thereon open the pipe 4 and permit the venting of the pressure resulting from the combustion of the gas in the coal bin and gas producer without damage to the apparatus. If the force of the explosion is sufficient the yoke 25 on the arm 24 engages the rubber block 36 and the upward movement of the arm 24 stopped. The resiliency of the block 36 and the force of gravity then serve to return the arm 24 and the disks thereon to their lower position where the disk 28 seats on the ring 12 and is held seated thereon by gravity forming a valve closing the outer end of the pipe 4 and preventing the flow of air into the coal bin 1 or excessive leakage of gas therefrom. The weight of the arm 24 and the disks thereon is sufficient to prevent excessive leakage from the gas producer and coal bin under the normal working pressure in the gas producer and permits of the gas producer being continued in operation until opportunity is found to shut down the operation of the gas producer while the ring 12 is removed, the ruptured disks 10 replaced and the new disks secured in place by the reapplication of the ring 12.

I claim—

1. In an explosion relief means for gas producers, a vent opening from the producer arranged to discharge in a horizontal direction, a disk rupturable under pressure of a gas explosion in the producer, means securing said disk in position to seal the vent opening against gas leakage from the producer, a valve arranged to shield said disk, an arm supporting said valve, said arm being pivotally supported above the level of said vent opening for movement in a vertical plane and supporting said valve so said valve is operable by fluid pressure upon the rupturing of said disk by the pressure of an explosion in the producer to a position out of line with said vent to leave said vent unobstructed for the passage of solid fuel ejected by the explosion and means for stopping the opening movement of said valve in a raised position of said valve from which position said valve returns by gravity to close said vent opening.

2. In an explosion relief means for gas producers, a vent opening from the producer arranged to discharge in a horizontal direction, a disk rupturable under pressure of a gas explosion in the producer, means securing said disk in position to seal the vent opening, a valve arranged to shield said disk, an arm supporting said valve, said arm being pivotally supported above the level of said vent opening for movement in a vertical plane and supporting said valve so said valve is operable by fluid pressure upon the rupturing of said disk to a position above and out of line with said vent opening, and means stopping opening movement of said valve at a point above the vent opening, said stop means being positioned to permit closure of said valve by gravity and a movement of said valve of sufficient duration for the completion of the discharge of solids from the vent opening.

3. In an explosion relief means for gas producers, a vent opening arranged to discharge in a horizontal direction, rupturable means sealing said vent opening, a valve shielding said rupturable means, an arm for supporting said valve, means pivotally supporting said arm at a point higher than said vent opening and for movement in a vertical plane, said arm supporting said valve for an upwardly swinging movement out of line with said vent opening upon rupturing of said disk by an explosion in said gas producer, and means for stopping the upwardly swinging movement of said valve at a point above the vent opening and from which the valve will return by gravity to close said vent opening.

4. In an explosion relief means for gas producers, vent means having an opening lying substantially in a vertical plane, rupturable means sealing said opening, a valve shielding said rupturable means, an arm supporting said valve, said arm being pivotally mounted above said vent means for movement in a vertical plane, and means for stopping the upwardly swinging movement of said valve at a point above the vent opening and from which the valve will return by gravity to close said vent opening.

5. In an explosion relief means for gas producers, vent means having an opening discharging horizontally, rupturable means sealing said opening, a valve for closing said opening, said valve covering said rupturable means, an arm supporting said valve, said arm being pivotally mounted above the level of said vent means for movement in a vertical plane, and stop means above the pivot point for said arm for stopping the upwardly swinging movement of said valve at a point above the vent opening and from which the valve will return by gravity to close said vent opening, said stop means being positioned to permit a movement of said valve of sufficient duration for the completion of the discharge of solids from the vent opening.

ALBERT LEET GALUSHA.